United States Patent [19]
Ugawa et al.

[11] Patent Number: 5,146,068
[45] Date of Patent: Sep. 8, 1992

[54] SYSTEM FOR AUTHENTICATING AN AUTHORIZED USER OF AN IC CARD

[75] Inventors: Akira Ugawa; Toshio Takizawa, both of Tokyo, Japan

[73] Assignee: Oki Electric Industry Co., Ltd., Tokyo, Japan

[21] Appl. No.: 618,287

[22] Filed: Nov. 28, 1990

[30] Foreign Application Priority Data
Dec. 1, 1989 [JP] Japan ................... 1-310533

[51] Int. Cl.$^5$ ............................. G06K 7/06
[52] U.S. Cl. ................... 235/441; 235/379; 235/436; 235/492
[58] Field of Search ............... 235/379, 380, 382, 436, 235/441, 492

[56] References Cited

U.S. PATENT DOCUMENTS

| | | |
|---|---|---|
| 4,105,156 | 8/1978 | Dethloff . |
| 4,590,365 | 5/1986 | Okada ................. 235/492 X |
| 4,839,506 | 6/1989 | Homma et al. ......... 235/492 X |
| 4,851,653 | 7/1989 | Limisaque et al. ......... 235/492 |
| 4,879,455 | 11/1989 | Butterworth et al. ......... 235/492 X |

Primary Examiner—David Trafton
Attorney, Agent, or Firm—Spencer, Frank & Schneider

[57] ABSTRACT

An IC card which has a timer circuit that shuts off the IC card within a predetermined time interval is used with a terminal which resets the timer circuit in the IC card in response to any terminal operations. This prevents the IC card from shutting itself off during the terminal operations.

4 Claims, 7 Drawing Sheets

SYSTEM FOR AUTHENTICATING AN AUTHORIZED USER OF AN IC CARD

BACKGROUND OF THE INVENTION

1. Field of the Invention

This invention relates to a system for authenticating an authorized user of a card with an interior IC circuit, which is known as an "IC card". Further, this invention especially relates to the combination of an IC card which has a timer circuit which shuts off the IC card within a predetermined interval, and a terminal unit which resets the timer circuit in the IC card in response to any terminal operations so as to prevent the IC card from shutting off by itself during the terminal operations.

2. Brief description of the related art

Recently, banking systems have employed plastic bank cards having respective thin magnetic stripes thereon for identification of authorized users. For example, to use an auto teller machine (hereinafter, an ATM), an operator inserts such a bank card into a magnetic card reader provided in the ATM and enters a password comprising four or five alphanumeric letters from a key board.

If the entered password and identification data (ID data) recorded in the magnetic stripe are identical, the ATM recognizes that the operator is authorized (i.e. a true bank customer) and proceeds with predetermined banking procedures, for example, withdrawing money, checking the balance of the customer's account, or other transactions.

However, according to the conventional method, if someone steals the card, that person can try several possible passwords in an attempt to find the true password.

For a conventional IC card, the basic operations are almost the same as those mentioned above. Therefore, a person who stole an IC card can try different passwords several times at an auto teller machine.

An example of a conventional IC card and a security system are disclosed in U.S. Pat. No. 4,105,156.

OBJECTS AND SUMMARY OF THE INVENTION

An object of the present invention is to provide a system for authenticating an authorized user of an IC card which prevents illegal use of a stolen or lost IC card. To accomplish this object, the present invention provides an IC card which automatically shuts itself off within a predetermined interval according to a timer circuit therein.

Another object of the present invention is to provide an authentication system which comprises a combination of such an IC card and a terminal unit which resets the timer circuit upon any terminal operations to keep the IC card activated during the time that the IC card is inserted in the terminal unit.

The present invention provides an IC card which includes:

(a) a memory circuit which stores a control program and predetermined information;

(b) a timer circuit which counts up to a first interval and which can be cleared by a reset signal; and (c) a first microprocessor coupled to the memory circuit and the timer circuit for accessing the predetermined information and for controlling the timer circuit according to the control program, the first microprocessor watching the status of the timer circuit and disabling itself from accessing the information if the timer circuit counts up to the first interval (that is, if the timer circuit times out).

Further, the present invention provides a terminal unit for use with the IC card, which terminal unit includes:

(a) an IC card receiving unit with a slot which accepts the IC card, the receiving unit providing electrical coupling with the first microprocessor in the IC card; and (b) a second microprocessor electrically connected to the receiving unit which can communicate with the first microprocessor in the IC card, the second microprocessor sending a reset signal to the first microprocessor to reset the timer circuit in the IC card in response to any terminal operations.

Further, the terminal unit could include a second timer which establishes a time limit for the terminal operations. If there are no terminal operations until the second timer's counting up, the terminal unit aborts all transactions with regard to the IC card and ejects the IC card therefrom.

BRIEF DESCRIPTION OF THE DRAWINGS

These and other features and advantages of the invention may be more completely understood from the following detailed description of the preferred embodiments of the invention with reference to the accompanying drawings, in which:

FIG. 1 (b) illustrates a back view of the IC card of the invention;

DESCRIPTION OF THE PREFERRED EMBODIMENT

Figure 1A:
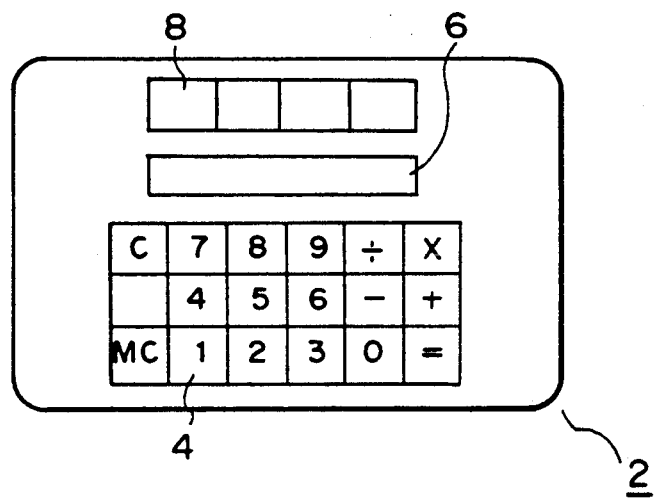
FIG. 1 (a) illustrates a front view of the IC card of the invention.
Figure 1B:
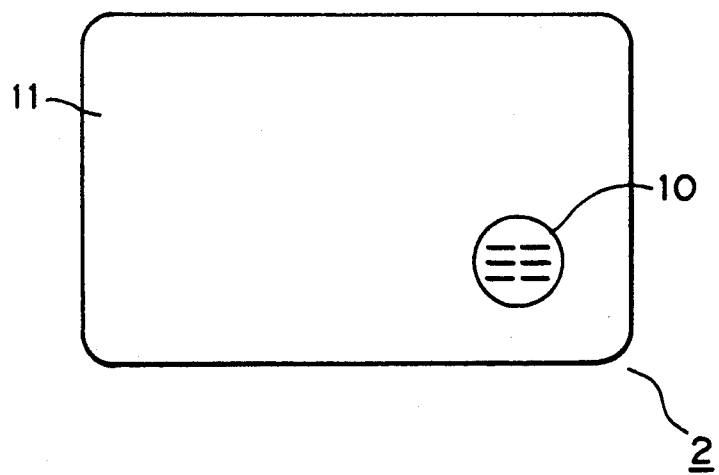

As shown in FIG. 1 (a) and FIG. 1 (b), the IC card 2 of the present invention outwardly comprises a keypad 4 for inputting numeric data, an LC (Liquid Crystal) display 6 for displaying data, a solar battery 8 for charging an inner rechargeable battery (not shown in this drawing), and six contact leads 10. The keypad 6 includes ten numeral-entry keys and various arithmetic calculation keys. The contents of the IC card 2 comprises one or more IC chips. Instructions, a name or trademark, or a caution notice for the operator could be written or printed on a back surface 11 of the IC card 2.

Figure 2:
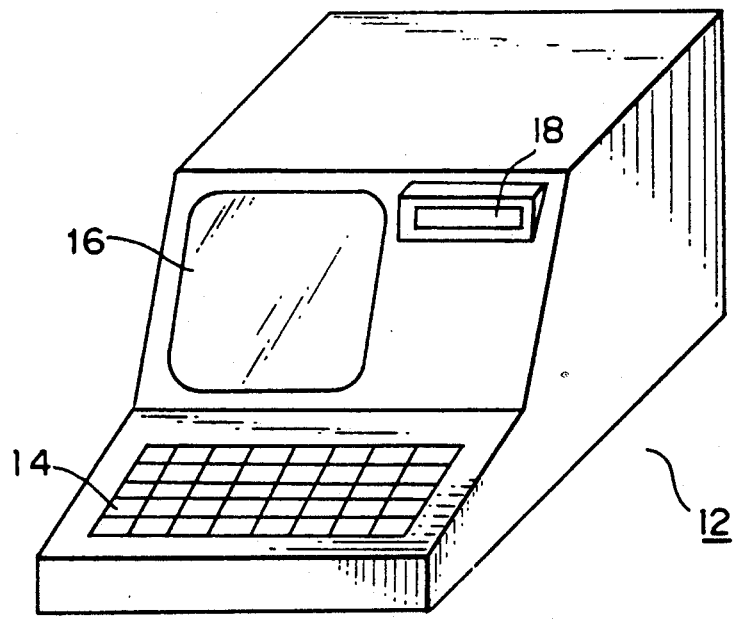
FIG. 2 illustrates a perspective view of a terminal unit for use with the IC card of the invention.

FIG. 2 illustrates an appearance of a terminal unit 12 for use with the IC card 2. The terminal unit 12 outwardly comprises a key board 14 for inputting a data or commands, a CRT display 16, and an IC card slot 18 to accept the IC card 2. The card slot 18 is part of a card receiving unit with a connector (not shown) which is electrically coupled to the six contact leads 10 on the IC card 2 when the IC card 2 is inserted in the card slot 18.

The terminal unit 12 could be combined with a conventional ATM machine or could be provided as a stand-alone ID data checking terminal at a checking point such as a gate which needs security.

Figure 3:
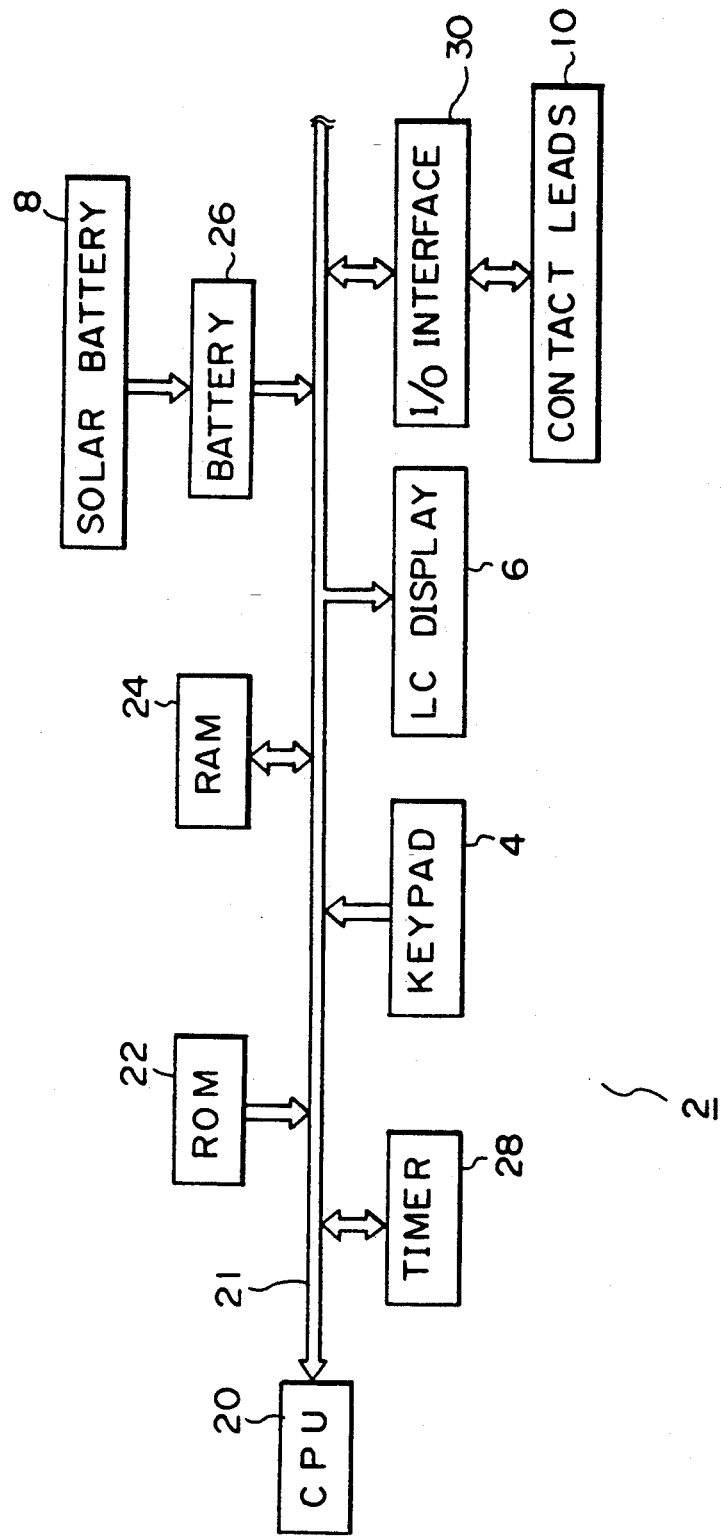
FIG. 3 illustrates a block diagram of the IC card of the invention.
Figure 4:
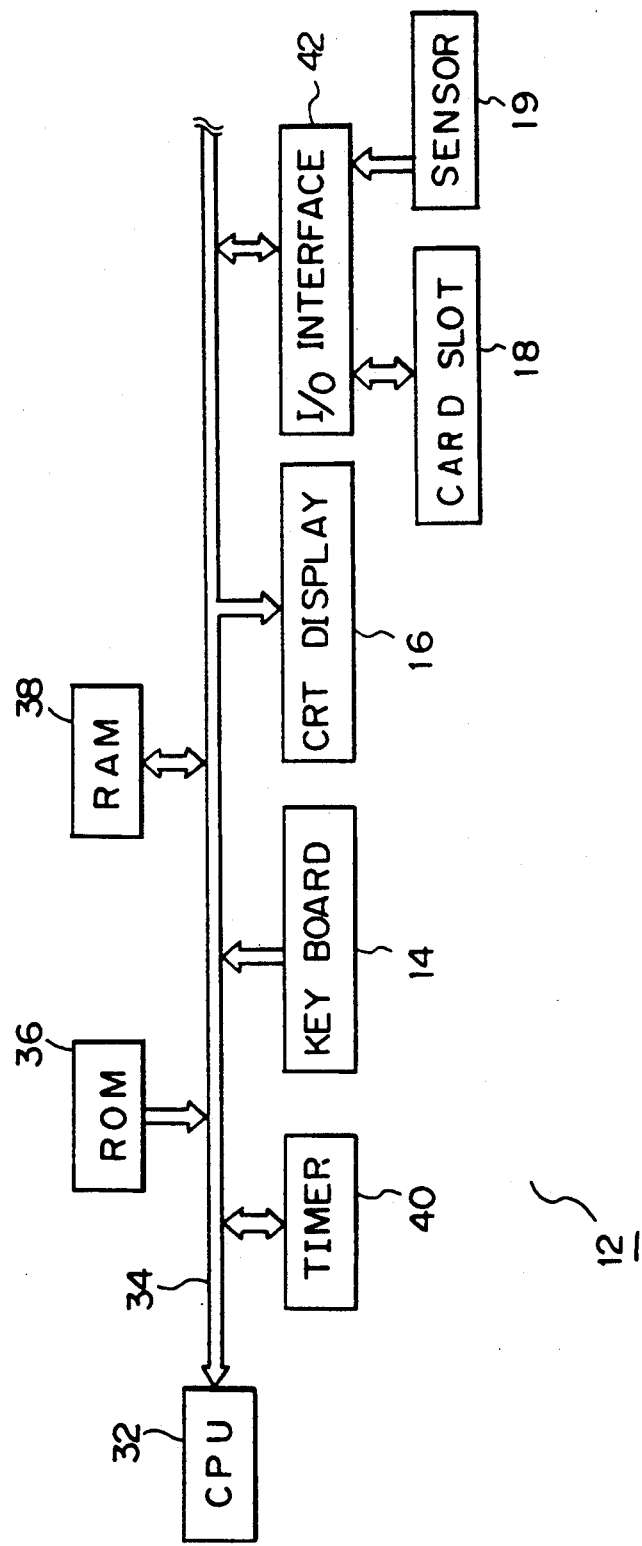
FIG. 4 illustrates a block diagram of the terminal unit of the invention.

FIG. 3 and FIG. 4 are block diagrams of both the IC card 2 and the terminal unit 12.

As shown in FIG. 3, the IC card 2 comprises a central processing unit 20 (hereinafter, CPU), a read only memory 22 (hereinafter, ROM) for storing fixed data or a control program for the CPU 22, a random access memory (hereinafter, RAM) 24 for a working area of the CPU 20, a rechargeable battery 26 which is connected to and charged by the solar battery 8, an input/output interface 30 (hereinafter, I/O interface) coupled with the six contact leads 10 which sends/receives information to/from the IC card 2, the keypad 4 for data inputting by an operator or user, and the LC display 6 for displaying information in the IC card 2. The above mentioned elements are connected to each other by an internal bus 21.

The IC card 2 could be comprised of one or several conventional ICs and several conventional electric parts. For example, the MSM62580 IC made by OKI ELECTRIC INDUSTRY CO., LTD. for use in such an IC card includes a CPU, a 3K byte ROM, and a 128 bit RAM. Therefore, it would be possible to form the IC card 2 by combining the MSM62580 IC and several conventional ICs or electric parts, such as a timer IC, a small one-line LC display and a solar battery.

Further, if possible, the timer circuit 28 could be replaced by a predetermined time constant circuit (i.e., an RC circuit) which can be cleared by a signal like a "watch dog timer".

As shown in FIG. 4, the terminal unit 12 mainly comprises a CPU 32, a ROM 36 for storing a control program for the CPU 22, a RAM 38 for a work area of the CPU 32, a timer circuit 40, the key board 14 for data inputting, the CRT display 16, and an IC card receiving unit which includes the IC card slot 18 for accepting the IC card 2, a sensor 19 provided adjacent to the card slot 18 for detecting insertion/ejection of the IC card 2, and an input/output interface 42. The above mentioned elements are connected to each other by an internal bus 34.

The terminal unit 12 could be comprised of conventional ICs or several conventional electric parts. For example, the CPU 32 could be an MSM 80C86 IC and the ROM 36 could be MSM27C1024 or MSM27C128 ICs and the RAM 38 could be MSM5188RS or MSM51257 ICs and the timer circuit 40 could be comprised of an MSM-58321 IC, each of which is made by OKI ELECTRIC INDUSTRY CO., LTD.

Of course, other elements, for example, the sensor 19, could be manufactured from conventional parts such as a combination of a photo sensor and a light source. Such parts themselves are conventional and accept any modification within the scope of the present invention.

Figure 5:
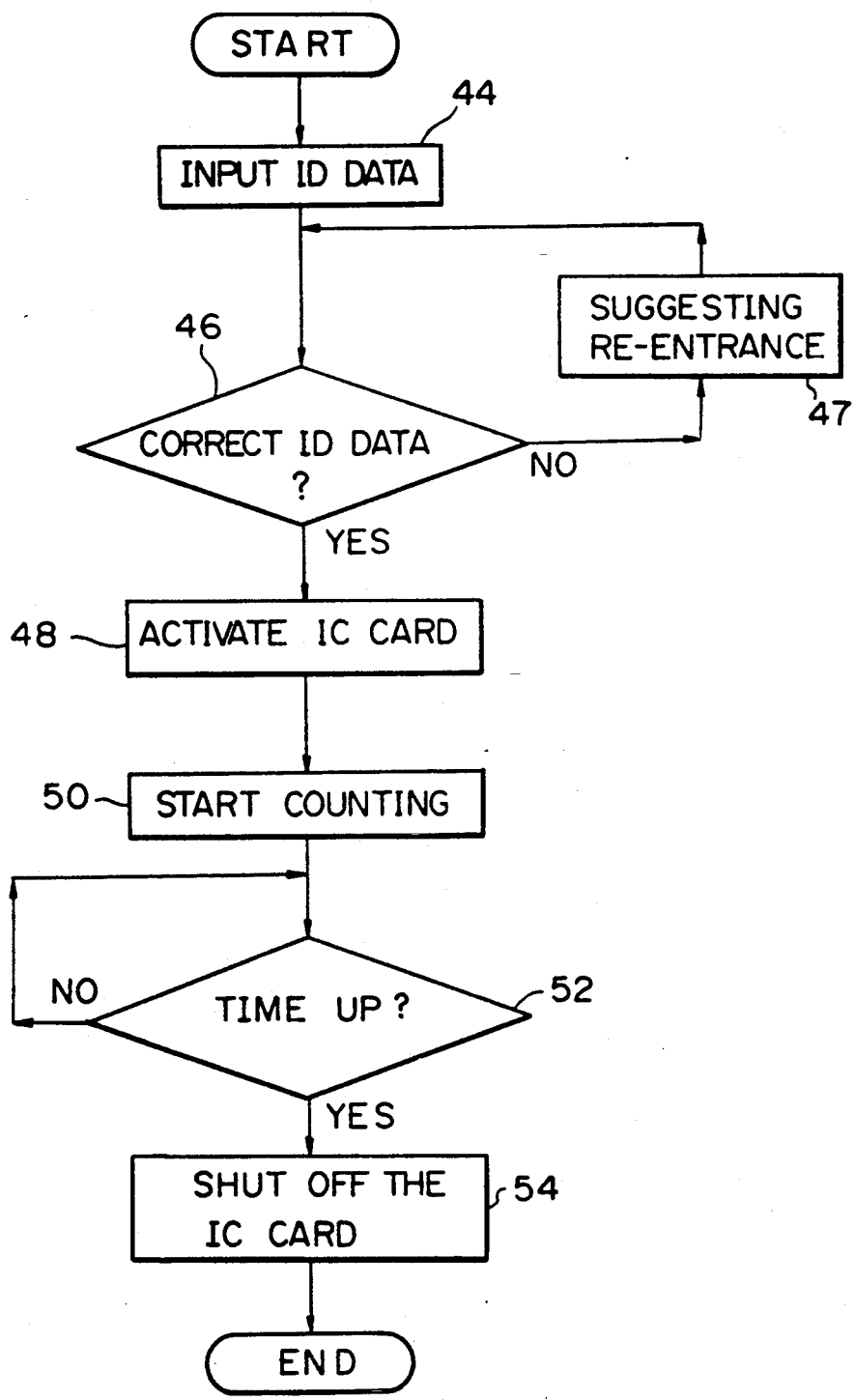
FIG. 5 is a flow chart for explaining the operation of th IC card.
Figure 6:
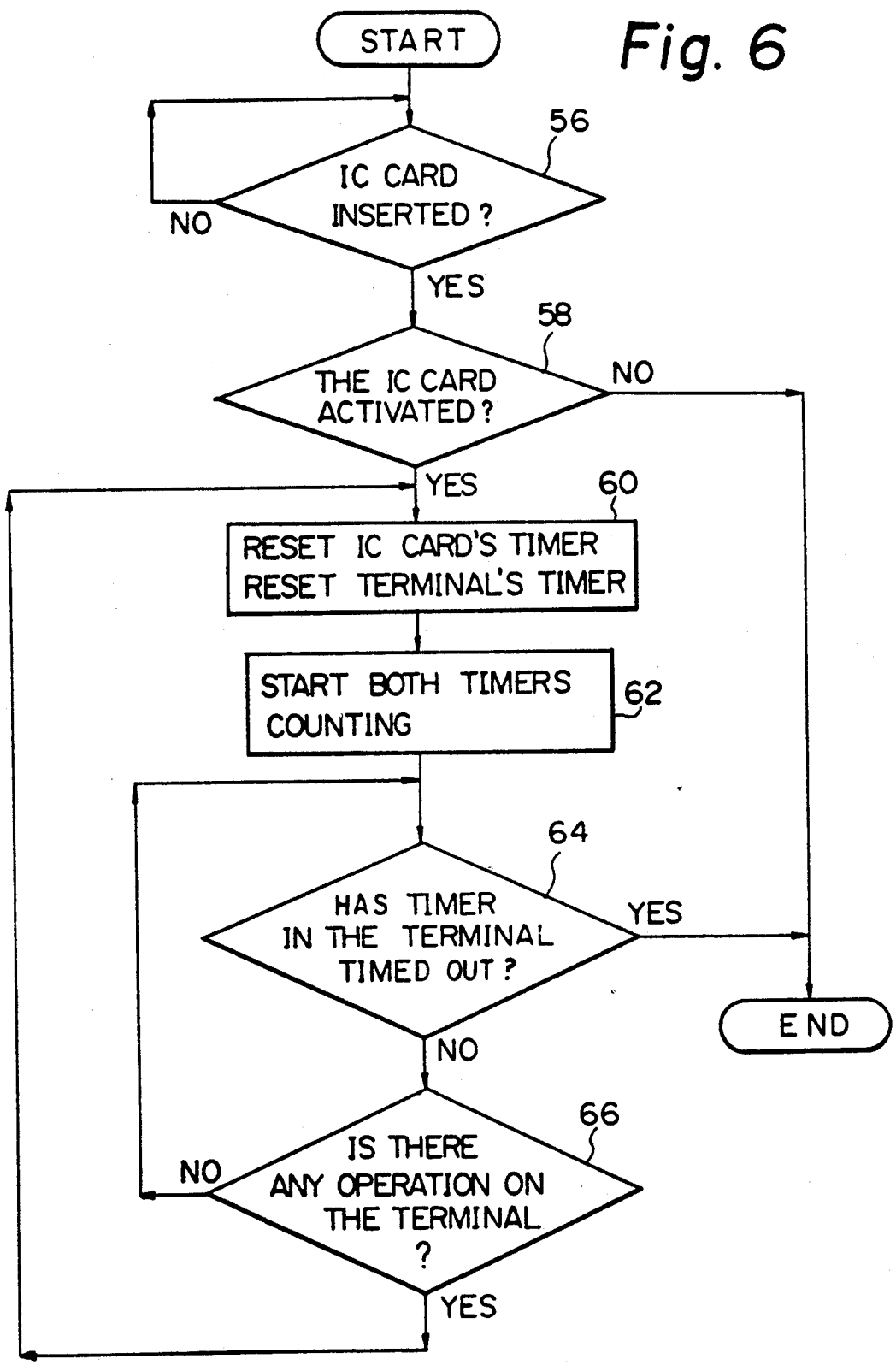
FIG. 6 is a flow chart for explaining the operation of the terminal unit.
Figure 7:
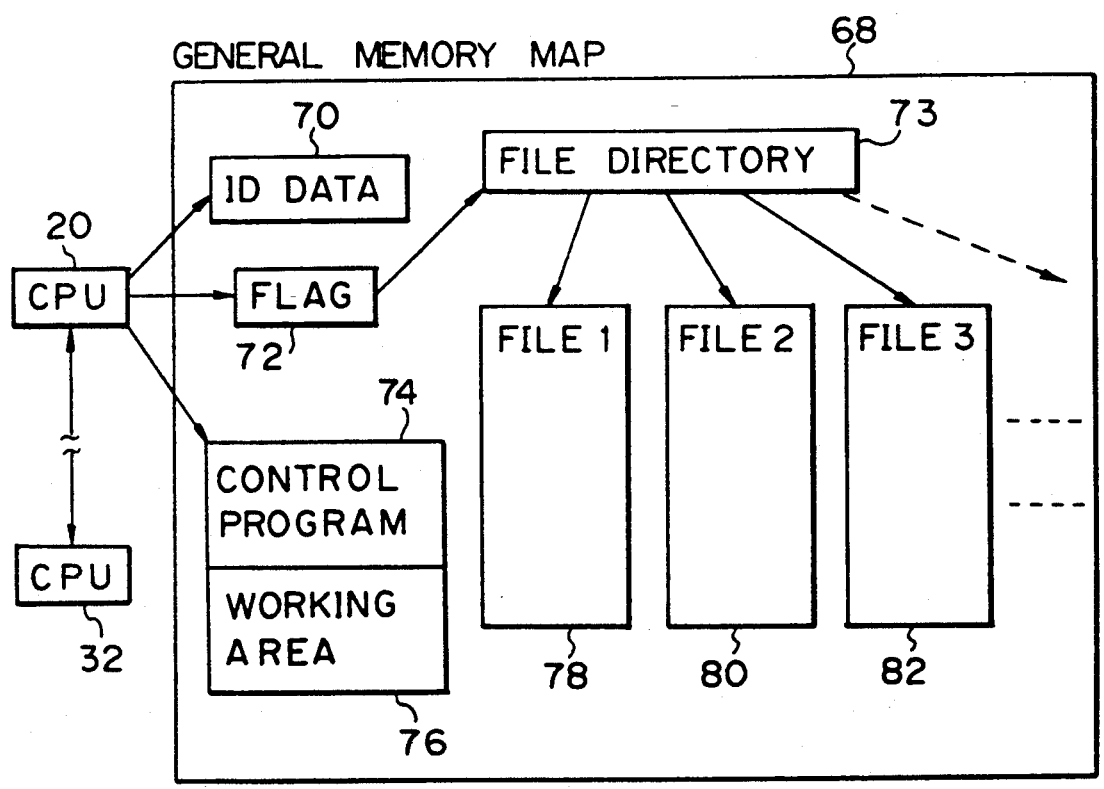
FIG. 7 is a drawing for explaining the general memory structure of the IC card.

The operation of card 2 and terminal unit 12 will be explained below using the flow charts in FIG. 5 and FIG. 6 and using a general memory map 68 as shown in FIG. 7.

Suppose that the predetermined interval has passed and that the IC card 2 can accept only inputs from the keypad 4, but cannot be used as an ID card at the terminal unit 12. This means that if an operator or user inserts the IC card 2 into the card slot 18 in the terminal unit 12, the IC card 2 is automatically ejected from the card slot 18, without any financial operations being permitted.

At step 44, the user inputs ID data (i.e., a password) which shows the operator's identity to the IC card 2 using the keypad 4. The CPU 20 of card 2 receives the ID data via the internal bus 21 and analyzes the inputted ID data according to a control program (area 74 in FIG. 7) stored in the ROM 22 (step 46). In detail, the CPU 20 compares the inputted ID data and true ID data (area 70 in FIG. 7) which has previously been stored in ROM 22. If necessary, the true ID data can be stored in RAM 24 with battery backup from the battery 26

If those ID data are identical, the CPU 20 stores the data "1" as a "FLAG" (area 72 in FIG. 7) in the RAM 24. If the inputted ID data is wrong, the CPU stores the data "0" as the "FLAG" 72.

If the inputted ID data is wrong, at step 47 the CPU 22 displays a message on the LC display 6 to suggest that the operator re-enter the ID data. It is further possible to limit the number of times that entry of the ID data can be attempted. For example, if the operator fails to input the correct ID data after three tries, the IC card 2 does not accept inputs from the keypad 4 until the energy stored in rechargeable battery 26 is used up.

If the operator inputs the correct ID data, the CPU 20 activates the IC card 2 (step 48). In detail, as mentioned above, the CPU 20 provides the data "1" as a "FLAG" 72 and activates the timer circuit 28 to start counting (step 50).

The timer circuit 28 can count a predetermined interval. If the timer circuit 28 counts the interval up or "times out" (step 52), the timer circuit 28 signals the CPU 20 via the internal bus 21. If the CPU 20 detects such situation, the CPU 20 clears the "FLAG" 72 (changes the data "1" to "0") in the RAM 24 (step 54).

As shown in FIG. 7, all of the accessible data in the ROM 22 or RAM 24 have file structures, like FILE 1 (78), FILE 2 (80), and FILE 3 (82), and the CPU 20 always accesses those files using a "FILE DIRECTORY" 73 after referring to the "FLAG" 72. According to the present invention, if the "FLAG" 72 has the data "1", the CPU 20 can access any accessible data in those files.

On the other hand, if the "FLAG" 72 has the data "0", the CPU 20 cannot access any data in those files (step 54). As a result, the IC card 2 can be used for transactions only during the interval. Therefore, if the true owner of the IC card 2 loses it or is robbed, some other person who obtains the IC card 2 cannot use it after the predetermined interval elapses without knowing the password.

Next, suppose that the IC card 2 has been activated in step 52. After inputting the correct ID data, the user or operator inserts the IC card 2 into the card slot 18 of the terminal unit 12. The insertion of the IC card 2 is detected by the sensor 19 and the CPU 3 of the terminal unit 12 is informed of the insertion of the IC card 2 via the internal bus 34 (step 56 in FIG. 6).

Such a card detection technique is conventional and is not an essential point of the present invention.

When the IC card 2 is inserted into the card slot 18, the contact leads 10 are electrically coupled to the I/0 interface 42 of the terminal unit 12. Of course, it would be possible for the CPU 32 to detect the insertion by sensing the electric status of the six contact leads 10 without using the sensor 19.

Further, the CPU 32 accesses the CPU 20 in the IC card 2 via the contact leads 10 to determine whether the IC card 2 is activated or not.

In detail, the CPU 32 provides a first command signal to the CPU 20 to make the CPU 20 determine the contents of the "FLAG" 72 in the RAM 24 and return a response signal as to the result. The CPU 32 in the terminal unit 12 receives the response signal and acknowledge the contents of the "FLAG" 72 (step 58).

If the "FLAG" 72 has the data "0", the CPU 32 in the terminal unit 12 determines that the IC card 2 is not activated and executes a predetermined ejection procedure. For example, the terminal unit 12 may eject the IC card 2 from the card slot 18 and display a message on the CRT display 16 to suggest that the operator re-enter the correct ID data to the IC card 2. There are a lot of conventional ejection procedures in this technical field. For example, an ejection procedure for a conventional magnetic banking card could be applicable.

If the "FLAG" has the data "1", the CPU 32 in the terminal unit 12 controls the timer circuit 40 thereof and makes it start counting. Further the CPU 32 sends a second command signal to the CPU 20 in the IC card 2 via the six contact leads 10 to reset the timer circuit 28 in the IC card 2 (step 60). Both the timer circuits continue counting automatically after resetting (step 62).

If the timer circuit 40 in the terminal unit 12 counts up or "times out" the CPU 32 recognizes that there have been no operations at the terminal 12 and proceeds with the ejection procedure (step 64).

If there are any terminal operations on the terminal unit 12, the CPU 32 resets its own timer circuit 40 and sends the second command signal to the CPU 20 in the IC card 2 to reset the timer circuit 28 in the IC card 2 (return to step 60).

This loop continues until the operator finishes the transactions or leaves the terminal unit without terminal operations. Of course, during this loop, the CPU 32 in the terminal unit 12 and the CPU 20 can proceed with predetermined procedures according to the predetermined program in the ROM 22 or ROM 36 in response to the terminal operations by the operator.

Therefore, if the transaction is finished, the terminal unit 12 can eject the IC card 2 from the card slot 18 even though the IC card 2 is still activated.

In this embodiment, the time limit of the timer circuit 40 should be longer than that of the timer circuit 28 to avoid an aborted procedure during the operations. Because the CPU 20 always refers to the "FLAG" 72 before accessing files, if the CPU 32 in the terminal unit 12 detects that the CPU 20 can not access the files because of counting up (that is, "FLAG" has the data "0"), the CPU 32 proceeds with the ejection procedure automatically.

However, it may be possible to make both time limits the same or different by means of controlling both timings of resetting.

According to the present invention, an illegal obtainer of the IC card 2 cannot use the IC card 2 unless he/she knows the correct ID data, because the IC card 2 is automatically shut off by itself in a predetermined interval. Of course, an un-activated IC card cannot be used at the terminal unit 12. Therefore, even if the true owner of the IC card 2 has lost the IC card 2 unintentionally, an illegal obtainer of the IC card 2 cannot use it.

We claim:

1. An authentication system comprising a combination of:
    (a) an IC card which includes
        (a-1) memory means for storing ID data,
        (a-2) first signal exchange means for exchanging signals with a terminal unit,
        (a-3) first timer means for measuring a first time interval and generating a first control signal if the first time interval expires, the first timer means including means for clearing the first timer means in response to a first reset signal,
        (a-4) a keypad having a plurality of keys, and
        (a-5) first control means, electrically coupled to the memory means, the first signal exchange means, the first timer means, and the keypad, for activating the IC card when the ID data stored in the memory means is identical to ID data manually entered on the keypad, and for deactivating the IC card in response to the first control signal; and
    (b) a terminal unit which includes
        (b-1) IC card receiving means for accepting the IC card, the IC card receiving means including second signal exchange means for providing electrical coupling with the first signal exchange means of the IC card,
        (b-2) second timer means for measuring a second time interval and generating a second control signal if the second time interval expires, the second timer means including means for clearing the second timer means in response to a second reset signal, and
        (b-3) second control means, electrically coupled to the second timer means and to the second signal exchange means, for communicating with the first control means in the IC card, for generating the second reset signal in response to any terminal operations, the second reset signal being conveyed to the IC card and to the second timer means in the terminal unit, and for terminating a transaction at the terminal unit if the IC card is deactivated or the second timer means generates the second control signal.

2. The authentication system of claim 1, wherein the first control means comprises means for generating the first reset signal if the second reset signal is generated by the second control means.

3. The authentication system of claim 1, wherein the first time interval is longer than the second time interval.

4. A method for operating an authentication system which includes an IC card and a terminal unit which receives the IC card, the IC card including a memory, a keypad, and a first timer and the terminal unit including a second timer, said method comprising the steps of:
    (a) activating the IC card if ID data stored in the memory matches ID data manually entered on the keyboard;
    (b) deactivating the IC card if the first timer measures a first time period and if a reset signal has not been received from the terminal unit;
    (c) terminating a transaction after the terminal unit receives an activated IC card if the second timer measures a second time interval and no terminal operations have been conducted; and
    (d) resetting the first and second timer in response to any terminal operations while the IC card is activated.

* * * * *